(12) United States Patent
Milby

(10) Patent No.: US 8,473,466 B1
(45) Date of Patent: Jun. 25, 2013

(54) SYSTEMS AND METHODS FOR STORING DATA, SUCH AS STORING DATA BASED ON STORAGE CLASSES

(75) Inventor: Gregory Milby, San Marcos, CA (US)

(73) Assignee: Teradata US, Inc., Dayton, OH (US)

( * ) Notice: Subject to any disclaimer, the term of this patent is extended or adjusted under 35 U.S.C. 154(b) by 704 days.

(21) Appl. No.: 11/968,106

(22) Filed: Dec. 31, 2007

(51) Int. Cl.
*G06F 12/00* (2006.01)

(52) U.S. Cl.
USPC .......................... 707/694; 711/165; 711/114

(58) Field of Classification Search
USPC ........................ 707/999.1, 694; 711/165, 114
See application file for complete search history.

(56) References Cited

U.S. PATENT DOCUMENTS

| | | | |
|---|---|---|---|
| 5,018,060 A * | 5/1991 | Gelb et al. ............................. | 1/1 |
| 5,842,220 A * | 11/1998 | De Groot et al. ...................... | 1/1 |
| 6,052,684 A * | 4/2000 | Du ......................................... | 1/1 |
| 6,278,994 B1 * | 8/2001 | Fuh et al. .............................. | 1/1 |
| 6,618,822 B1 * | 9/2003 | Loaiza et al. .................... | 714/20 |
| 7,139,745 B2 * | 11/2006 | Nakamura et al. ..................... | 1/1 |
| 7,139,749 B2 * | 11/2006 | Bossman et al. ...................... | 1/1 |
| 7,228,344 B2 * | 6/2007 | Whitlow ....................... | 709/220 |
| 2002/0065810 A1 * | 5/2002 | Bradley ............................. | 707/2 |
| 2002/0077997 A1 * | 6/2002 | Colby et al. ....................... | 707/1 |
| 2003/0123671 A1 * | 7/2003 | He et al. ......................... | 380/282 |
| 2005/0138401 A1 * | 6/2005 | Terao et al. .................... | 713/189 |
| 2005/0278398 A1 * | 12/2005 | Tokuda et al. ................ | 707/205 |
| 2006/0036898 A1 * | 2/2006 | Doering .......................... | 714/5 |
| 2006/0259728 A1 * | 11/2006 | Chandrasekaran et al. .. | 711/170 |
| 2007/0233949 A1 * | 10/2007 | Hart ............................... | 711/114 |

* cited by examiner

*Primary Examiner* — Truong Vo
*Assistant Examiner* — Sabana Rahman
(74) *Attorney, Agent, or Firm* — Michael Chan

(57) ABSTRACT

Systems and methods are described that create storage classes for data and store the data using storage resources based on the created storage classes. In some examples, the system stores data using storage resources having characteristics that satisfy the requirements of a storage class associated with the data. In some examples, the system stores data using storage resources that meet the minimum requirements for a storage class.

19 Claims, 18 Drawing Sheets

CREATE STORAGE CLASS <storage class name> <storage parameter clause>

<storage class name> ::= identifier - up to a 30 byte long character string.

<storage parameter clause> ::= WITH STORAGE PARAMETER

<left parenthesis> <system defined storage parameter list> <right parenthesis>

< system defined storage parameter list> ::=

ATWR <equals> { R | E | N } <comma>

SDFP <equals> { R | E | N } <comma>

DDFP <equals> { R | E | N } <comma>

SPFP <equals> { R | E | N } <comma>

NVOL <equals> { R | E | N } <comma>

RWRT <equals> { R | E | N } <comma>

CHKS <equals> { R | E | N } <comma>

ENCR <equals> { R | E | N } <comma>

CMPR <equals> { R | E | N }

R ::= Required

E ::= Excluded

N ::= Indifferent

*FIG. 9A*

```
GRANT <privileges options> ON <object name> TO <grantee>
[ { <comma> <grantee> } ]
[ WITH GRANT OPTION ]
REVOKE [ GRANT OPTION FOR ] <privileges options> ON <object name> { TO | FROM } <grantee>
<privileges options> ::=    { ALL [ PRIVILEGES ]}
| { ALL BUT <operation list> }    | <operation list>
<operation list> ::= <privileges> [ <optional grant column list> ]
<privileges> ::= {STORAGEUSAGE | STORAGECREATE   | !! All existing V2R6.2 alternatives}
<optional grant column list> ::= !! Existing syntax options
<object name> ::= <V2R6.2 object> | { STORAGE CLASS <storage class object> }
<V2R6.2 object> ::= !! Existing syntax options
<storage class object> ::= <storage class name>
<grantee> ::= !! All existing V2R6.2 alternatives
```

*FIG. 9B*

CREATE USER <user name>

[FROM <database name>]

AS PERMANENT <equals> <number bytes> <storage class clause> <comma>

PASSWORD = <password> <comma>

DEFAULT DATABASE NAME <equals> <database name> <comma>

SPOOL <equals> <number bytes> <storage class clause> <comma>

TEMPORARY <equals> <number bytes> <storage class clause> <comma>

FALLBACK [PROTECTION] <storage class clause> <comma>

DEFAULT JOURNAL TABLE <equals>

<database name> <period> <table name> <storage class clause> <semi-colon>

<storage class clause> ::= IN STORAGE <storage class name>

*FIG. 9C*

<create database> ::= CREATE DATABASE <database name> [FROM <database name>]

AS PERMANENT <equals> <number bytes> <storage class clause> <comma>

SPOOL <equals> <number bytes> <storage class clause> <comma>

TEMPORARY <equals> <number bytes> <storage class clause> <comma>

FALLBACK [PROTECTION] <storage class clause> <comma>

DEFAULT JOURNAL TABLE <equals>

<database name> <period> <table name> <storage class clause> <semi-colon>

*FIG. 9D*

```
<create table> ::= CREATE <table kind> TABLE <table name> <table options>    <left paren> <column definitions>

<table level definitions> <right paren>

[ <as clause> ] [ <commit options> ]

<table options> ::=

[   <comma> <storage class clause>

[   <comma> FALLBACK [PROTECTION] <storage class clause> ]

[   <comma> WITH JOURNAL TABLE <equals>    [ <database name> ] <period> <table name> <storage class clause> ] ]

<lob column definitions> ::= <lob column definition> [ { <comma> < lob column definition> } .... ]

<lob column definition> ::= { <lob predef type column definition> | <lob udt column definition> }   <storage class clause>

<storage class clause> ::=   IN STORAGE <storage class name>
```

*FIG. 9E*

CREATE STORAGE SIGNATURE <storage signature name>
<left squiggly bracket> <system defined storage attribute list><right squiggly bracket>
<system defined storage attribute list>::=
ATWR <equals> { Y | N } <comma>
SDFP <equals> { Y | N } <comma>
DDFP <equals> { Y | N } <comma>
SPFP <equals> { Y | N } <comma>
NVOL <equals> { Y | N } <comma>
RWRT <equals> { Y | N } <comma>
CHKS <equals> { Y | N } <comma>
ENCR <equals> { Y | N } <comma>
CMPR <equals> { Y | N }
Y ::= Yes, does have characteristic
N ::= No, does not have characteristic

*FIG. 9F*

CREATE STORAGE ATTRIBUTE <storage attribute name>

WITH STORAGE PARAMETER <storage parameter name>

{ <left parenthesis> R <comma> E <comma> N <right parenthesis> DEFAULT <equals> {R | E | N} <right parenthesis> } |

{ <left parenthesis> R <comma> E <right parenthesis> DEFAULT <equals> {R | E } <right parenthesis> } |

{ <left parenthesis> R <comma> N <right parenthesis> DEFAULT <equals> {R | N} <right parenthesis> } |

{ <left parenthesis> E <comma> N <right parenthesis> DEFAULT <equals> {E | N} <right parenthesis> } <semi-colon>

<storage attribute name> ::= up to a 30 byte character string representing the name of the attribute <storage parameter name> ::= up to a 30 byte character string representing the name the parameter

*FIG. 10A*

CREATE STORAGE CLASS  <storage class name>  <storage parameter clause>

<storage class name> ::= identifier - up to a 30 byte long character string.

<storage parameter clause> ::=  WITH STORAGE PARAMETER

<left parenthesis> <system defined storage parameter list> <comma> <user defined storage parameter list> <right parenthesis>

< system defined storage parameter list> ::=

ATWR <equals> { R | E | N } <comma>

SDFP <equals> { R | E | N } <comma>

DDFP <equals> { R | E | N } <comma>

SPFP <equals> { R | E | N } <comma>

NVOL <equals> { R | E | N } <comma>

RWRT <equals> { R | E | N } <comma>

CHKS <equals> { R | E | N } <comma>

ENCR <equals> { R | E | N } <comma>

CMPR <equals> { R | E | N }

< user defined storage parameter list> ::=  <user defined storage parameter specification>

{ ... <comma>  < user defined storage parameter specification }

< user defined storage parameter specification> ::=  <user defined storage parameter name> <equals> { R | E | N }

<user defined storage parameter name> ::= identifier - up to a 30 byte long character string

*FIG. 10B*

CREATE STORAGE SIGNATURE  <storage signature name>

<left squiggly bracket> <system defined storage attribute list> [<comma> <user defined storage attribute list>] <right squiggly bracket>

<system defined storage attribute list>::=

ATWR <equals> { Y | N } <comma>

SDFP <equals> { Y | N } <comma>

DDFP <equals> { Y | N } <comma>

SPFP <equals> { Y | N } <comma>

NVOL <equals> { Y | N } <comma>

RWRT <equals> { Y | N } <comma>

CHKS <equals> { Y | N } <comma>

ENCR <equals> { Y | N } <comma>

CMPR <equals> { Y | N }

<user defined storage attribute list>::= <user defined storage attribute specification>

{ ... <comma>  < user defined storage attribute specification }

< user defined storage attribute specification> ::= <user defined storage attribute name> <equals> { Y | N }

<user defined storage attribute name> ::= identifier - up to a 30 byte long character string.

Y ::= Yes, does have characteristic

N ::= No, does not have characteristic

SYSTEMS AND METHODS FOR STORING DATA, SUCH AS STORING DATA BASED ON STORAGE CLASSES

BACKGROUND

Database systems typically employ homogenous configurations of hardware, such that the system data is stored on an array of devices having identical characteristics. For example, all data may be stored on devices having the same storage capacities and data transfer speeds. Often, such a system is adequate when all of the data within an organization can be considered to be of the same importance or value.

In many organizations, however, certain data is considered to be of greater importance than other data. For example, some data may be associated with higher application performance requirements, enhanced security requirements, or otherwise require greater robustness or lower device failure rates. A conventional database system will store data on storage devices without regard for these requirements. As a result, valuable data may be stored on devices that are not qualified to store that data and hence, important data may be subject to unacceptable security risks and risks of loss due to device failure. Alternatively, all data is stored with all possible precautions, i.e., using the highest levels of encryption and only the most reliable devices. This approach, however, is extremely inefficient, as it requires the storage of relatively unimportant data on highly expensive systems.

BRIEF DESCRIPTION OF THE DRAWINGS

FIGS. 9A-9F are examples of syntax for statements used to implement some functions according to an exemplary embodiment.

FIGS. 10A-10C are examples of syntax for statements used to implement some functions according to an exemplary embodiment.

DETAILED DESCRIPTION

Overview

A system and method are disclosed for storing data based on defined characteristics of the data and storage devices. In some examples, a system is provided by which a database administrator is enabled to associate data with the type of hardware used to store and/or house the data. For example, the system can store often-used data in highly reliable and/or comparatively more expensive storage media using high performing storage resources, while storing less frequently-used data in inexpensive media using lower performing storage resources. Such diversification of storage resources and storage media based on data characteristics can enable businesses and other entities to protect important or core data using high-performing (expensive) resources while maintaining a cost efficient database system by utilizing lower performing (lower cost) resources for less important data.

In some examples, a storage class can be defined. The storage classes may relate to various levels of service for the database system and may be defined by one or more storage characteristics. The class may be set to identify certain features, such as "require", "exclude", or "indifferent." Such storage characteristics for a class can thereby define its signature. A storage resource can be defined to belong to one or more storage classes and data can be associated with a storage class.

The system may be configured so that data associated with a certain storage class will be stored on a storage resource also belonging to that storage class. That is, in those embodiments, the storage resource must be assigned at least the minimum conditions of the data for the data to be stored on that storage resource. In some examples, the storage class can be used to define a minimum standard such that data can be stored on storage resources exceeding the requirements of its class.

Various examples are described herein. The following description provides specific details for a thorough understanding and enabling description of these examples. One skilled in the art will understand, however, that the system may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Suitable System

Figure 1:
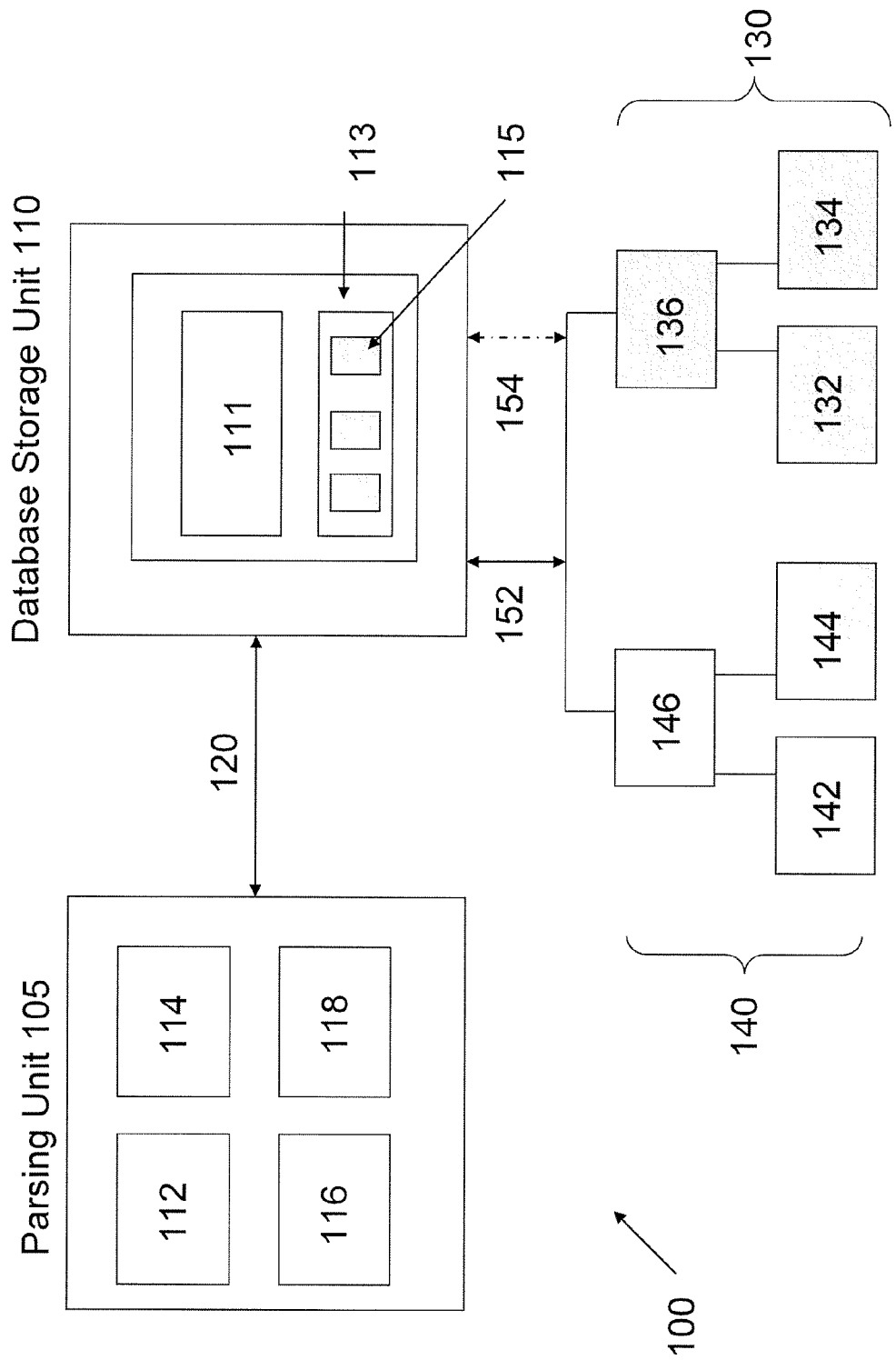
FIG. 1 is a block diagram illustrating a database system used to store and/or retrieve data based on the application of the data according to an exemplary embodiment.

Referring to FIG. 1, a block diagram illustrating an exemplary database system 100 used to store and/or retrieve data based on storage classes is shown. In general, the database system stores data in the form of database rows inserted into database tables. The database system 100 includes a parsing unit 105 and a database storage unit 110 as well as storage resources used to store data, such as higher performance resources 130 and lower performance resources 140. The database storage unit 110 may include a file system 111 and a free cylinder pool component 113 that contains one or more free cylinders 115 assigned a certain class of storage. The parsing unit 105 communicates with the database storage unit 110 over a high performance communications channel 120. For example, they may communicate over a BYNET interconnect, developed by Teradata, Inc., a FAST Ethernet channel, a direct connection (such as a LAN) and/or a wireless connection, such as a networked connection.

The parsing unit 105 includes a parser component 112 capable of identifying where database data is to be stored and of retrieving database data from storage, a database component 114 that stores tables and/or other data structures (e.g., an index) used to track where data is stored, an administration component 116 that enables a database administrator to access the database system, implement procedures, parameters and/or policies to the system, implement the storage classes, storage signatures, storage characteristics, and user-defined storage characteristics described herein, and so on. The parsing unit 105 also includes a storage class component 118 capable of performing the methods described herein, including assigning storage classes to various database components, including data, sets of data, data files, and other types of information. The parsing unit 105 may include other components, including hardware or software components, used in operation of the database system and operation of the transfer of data between the parsing unit and the database storage unit. For example, the parsing unit may include an operating system, user interface components that enable an administrator to interact with the parsing unit, storage policies and other policies that define storage processes, and so on. Alternatively, the database storage unit 110 may include other components, including hardware or software components, used in operation of the database storage unit and operation of the transfer of data between the database storage unit and parsing unit.

The database storage unit 110 may act as a storage manager, including a file system 111 and a free cylinder pool component 113. In one view, data in a database is stored as a series of rows in a database table, and may be stored within the file system 111. The tables, indexes, and table components are identified in both the database and in the file system by a table identifier, assigned during the initial creation of the table. Additionally, the database storage component 110 communicates with storage resources 130, 140 including storage interconnect components 136, 146 that transfer data to be stored to storage media 132, 134, 142, and 144. The database storage component 110 may communicate over a fixed network 152 or a wireless network 154, such as those described herein. The storage resources 130, 140 may perform at different levels of speed and/or efficiency, and may be assigned certain free cylinders based on performance requirements. For example, the higher performance resources 130 include a storage interconnect component 136 that transfers data from the database storage unit 110 to storage medium 132 or storage medium 134. Within the higher performance resources may be further levels of resources. For example, 132 may be resources having enhanced security capabilities, faster data transfer speeds, and larger capacities, while 134 may not have the enhanced security features.

Similarly, lower performance resources 140 include a data transfer component 146 that transfers data from the database storage unit 110 to storage medium 142 or storage medium 144. There may also be different levels of performance for resources within the lower performance resources 140. The storage medium 144 may include relatively less expensive resources as compared to medium 142 due to the capacity of the resources.

For example, the higher performance storage media 132 and 134 may be secondary storage devices, such as magnetic, optical or hard disks, and the lower performance storage devices 142 and 144 may be tertiary storage devices, such as magnetic tapes. Other examples of storage media used in either the higher or lower performance storage resources include optical storage media, semiconductor storage media, magneto-optical storage media, ultra-density optical storage media, media arrays, USB devices, and so on. The performance of the media may be characterized by a variety of factors, including storage capacity, storage density, latency, throughput, usage, reliability, protection, and so on.

Storage Classes

Figure 2:
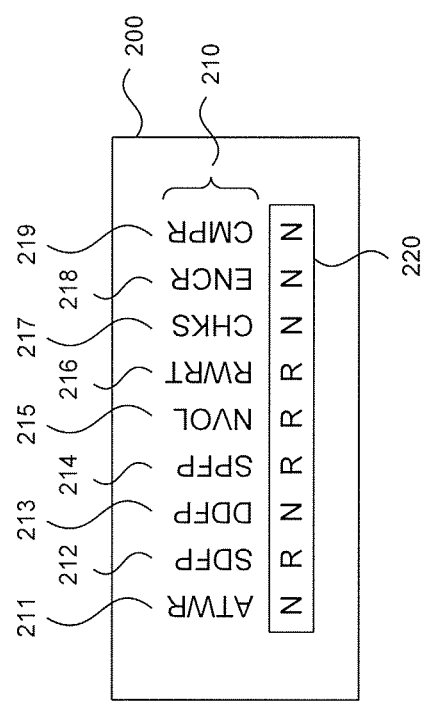
FIG. 2 is a schematic diagram illustrating a storage class for a database component according to an exemplary embodiment.

Referring to FIG. 2, a schematic diagram 200 illustrating a storage class for a database component is shown. The storage class can include one or more of storage characteristics 210. These characteristics include (but are not limited to:

Atomic Write (ATWR) 211,
Single Device Failure Protected (SDFP) 212,
Double Device Failure Protected (DDFP) 213,
Single Path Failure Protected (SPFP) 214,
Non-Volatile (NVOL) 215,
Re-Writable (RWRT) 216,
Checksum Protected Data and Path (CHKS) 217,
Encrypted (ENCR) 218, and
Compressed (CMPR) 219.

The diagram 200 also depicts the storage class signature 220 for the storage class. The storage class signature 220 includes information (such as values) about whether a characteristic is "required" (R) by the storage class, "excluded" (E) by the storage class, or whether the storage class is "indifferent" (N) to the characteristic. If a certain characteristic is "required" by a storage class and the RWRT characteristic 216. The other characteristics shown are marked as being "indifferent" relative to that storage class, meaning they may or may not be present, then the data associated with that class can only be stored on devices which have satisfy that characteristic. For example, if encryption is specified by a storage class as "required," then data associated with that class can be stored on a device supporting data. If a certain characteristic is "excluded" by a storage class, then the data associated with the class can not be stored on devices which satisfy that characteristic. For example, if devices having single device failure protection, a.k.a., RAID, are specified as "excluded" by a storage class, then data belonging to that class can not be stored on RAID type devices. If a certain characteristic is defined as "indifferent," then that characteristic will not be used as a factor in selecting a device for storage of data. Thus, a storage class is a storage requirements specification that defines the minimum set of storage characteristics required to use the storage device to construct various database components (such as tables, indexes, and so on) associated with that storage class.

In this example, the required characteristics for data components within the storage class are the SDFP characteristic 212, the SPF characteristic 214, the NVOL characteristic 215, A database administrator may establish or create a storage class by issuing SQL that defines the characteristics of the storage class and assigns the values of characteristics of the storage class. FIG. 9A illustrates a non-ANSI SQL syntax definition for a statement used for creating a storage class. Using the syntax definition of FIG. 9A, the following examples define storage classes for different levels of quality of service:

CREATE STORAGE CLASS NormStorage WITH STORAGE PARAMETER (ATWR=N, SDFP=R, DDFP=N, SPFP=R, RWRT=R, NVOL=R, CHKS=N, CMPR=N, ENCR=N);

CREATE STORAGE CLASS VeryProtectedAndExpensive WITH STORAGE PARAMETER (ATWR=R, SDFP=R, DDFP=R, SPFP=R, RWRT=R, NVOL=R, CHKS=R, CMPR=N, ENCR=N);

CREATE STORAGE CLASS TransientResearchStorage WITH STORAGE PARAMETER (ATWR=N, SDFP=N, DDFP=N, SPFP=N, RWRT=R, NVOL=R, CHKS=N, CMPR=N, ENCR=N).

In addition to sets or any other units of data, the system may associate various database components with a storage class. These may include some or all of a database, users, permanent tables, large object (LOB) columns, temporary tables, intermediate result spool files, permanent journals and fallback protection, and so on.

Any combination of SQL or SQL-like based examples of various database components and/or commands can be used with storage classes, data and storage devices. Some examples are provided below.

a) GRANT/REVOKE: Storage classes, once created, can be treated as database objects that can then be used in the database GRANT/REVOKE model. FIG. 9B illustrates a non-ANSI SQL based example of a syntax used when defining the GRANT/REVOKE model. The GRANT model provides two privilege levels: STORAGEUSAGE and STORAGECREATE. The STORAGECREATE can be used by a database administrator (DBA) to grant the privilege of being able to issue CREATE STORAGE CLASS and DROP STORAGE CLASS statements. The STORAGEUSAGE privilege is used by the DBA to grant usage of a particular storage class.

b) The <storage class clause>, "IN STORAGE CLASS <storage class name>", can be used in conjunction with the existing CREATE USER, CREATE DATABASE, and CREATE TABLE SQL statements to associate a particular storage class with a database, user, entire table (including some or all of its subcomponents), individual LOB or LOB user-defined datatype (UDT) columns, permanent journal tables, fallback protection, temporary tables, or spool files (intermediate result tables). For example, the following statement could be used: "CREATE TABLE BusinessCritical IN STORAGE CLASS VeryProtectedAndExpensive;".

c) The action of associating a table identifier and a storage class with tables, indexes, and other database components referenced within a SQL request is known as "resolving". This activity may be performed within the parsing unit. In some cases, a hierarchical mechanism can be employed relative to resolving the storage class to be associated with a particular table, table column, or table sub-component (e.g., permanent journal or fallback protection). In some cases, the top level of this hierarchy, LEVEL 1, refers to the entire database system, meaning all databases/users and all of their associated tables, indexes, etc. The next level of the hierarchy, LEVEL 2, refers to one specific database/user and all of the tables, indexes, and table subcomponents associated/created by that database/user. At the final level, LEVEL 3, lies the individual tables, indexes, or table subcomponents themselves. The database system should be able to apply some simple rules to enable it to resolve the storage class that is to be associated with the tables, indexes, and table subcomponents belonging to LEVEL 3 of the hierarchy, because these components are stored within the data storage unit file system. For example, the rules below can be applied to the hierarchy as follows:

Level 1: This level establishes a system-wide default storage class that will be implicitly associated with all the database components in the database system. This default storage class will be referred to as the SYSTEMSTORAGE storage class. This default storage class can be defined explicitly by either issuing a CREATE STORAGE CLASS statement or via assignment of database vendor specific environment control parameters. This storage class is the default storage class that will be associated with any table, table column, table subcomponent that does not have an explicitly associated Level 2 or Level 3 <storage class clause>.

Level 2: If the database/user in which the table, table-column, or table subcomponent exists was created, via CREATE DATABASE or CREATE USER, with the <storage class clause> and the table, table column, table subcomponent does not have a Level 3 <storage class clause> associated with it, then the Level 2 database/user level storage class definition will override the LEVEL 1 default storage class association and will be associated with the table, table-column, or table subcomponent.

Level 3: If a table, table-column, or table subcomponent was created, via CREATE TABLE, with a <storage class clause>, then that storage class association will override any Level 2 or Level 1 associations and will be the storage class that will be associated with the table, LOB table column, or table subcomponent.

d) CREATE USER: FIG. 9C illustrates an example of an enhanced SQL syntax for associating a storage class with a database user. The <storage class clause> can be used to perform the association. By applying the association to the AS PERMANENT clause, it is associated with some or all permanent space in the database. Associating with SPOOL allows that some or all transient/intermediate/scratch tables will be associated with the specified storage class. Associating with TEMPORARY allows that some or all created Temporary Tables will be associated with the specified storage class.

e) CREATE DATABASE: FIG. 9D illustrates an example of an enhanced SQL syntax for associating a storage class with a database. The <storage class clause> is used to perform the association. By applying the association to the AS PERMANENT clause, it is associated with some or all permanent space in the database. Associating with SPOOL allows that some or all transient/intermediate/scratch tables will be associated with the specified storage class. Associating with TEMPORARY allows that some or all created Temporary Tables will be associated with the specified storage class.

f) FIG. 9E illustrates an example of an enhanced SQL syntax for associating a storage class with a Table, Permanent Journal, and/or LOB/LOB-UDT column. The <storage class clause> is used to accomplish the association. In the SQL provided, the storage class clause can be used to associate a storage class with an entire table (and some or all of its sub-components), or individual LOB columns, individual LOB-UDT columns, or be associated with ANSI enhancements such as the permanent journal table, or the table's fallback protection.

Storing Data Using Data Characteristics

Figure 3A:
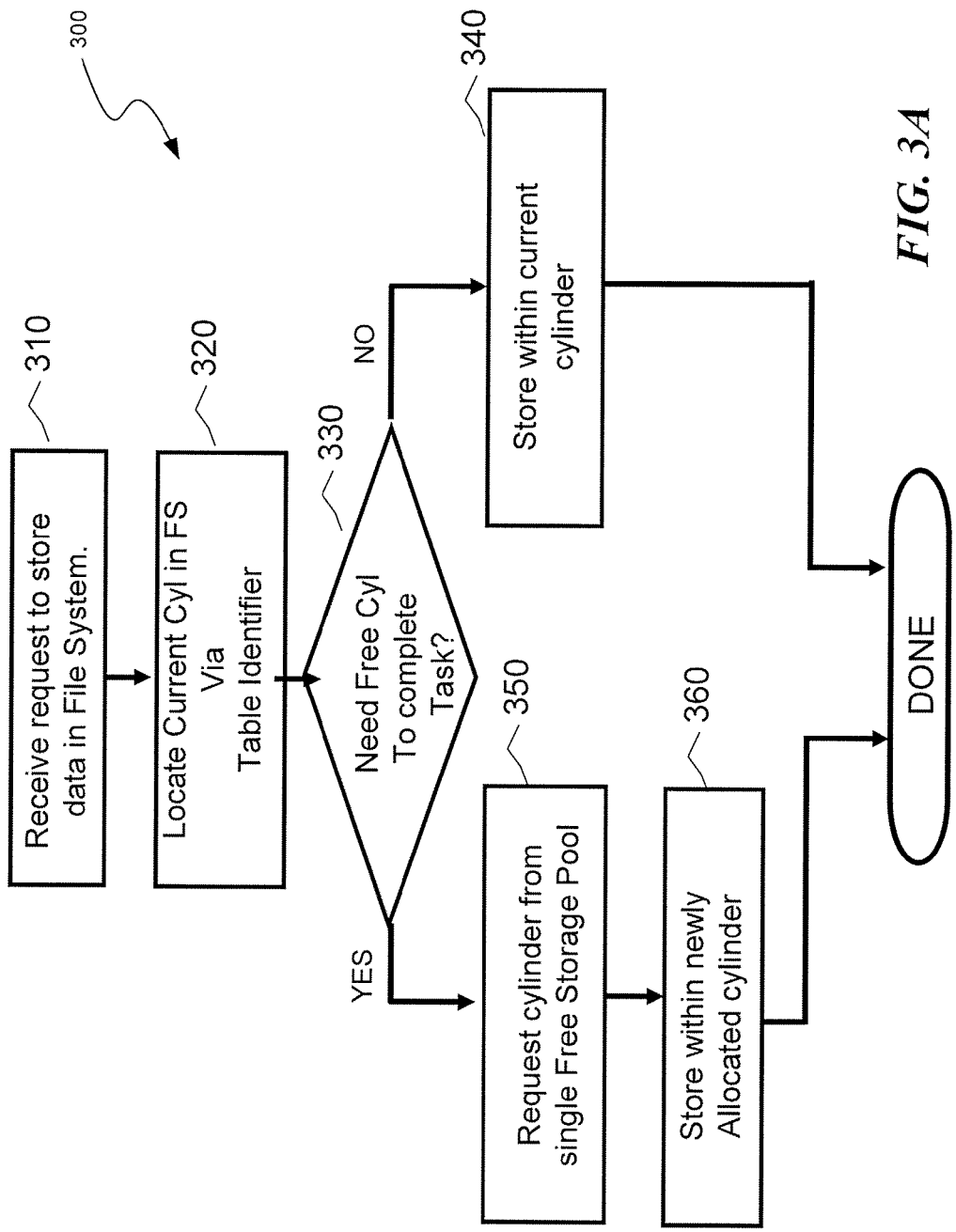
FIGS. 3A-3B are flow diagrams illustrating routines for storing data based on characteristics of the data according to exemplary embodiments.

Using the storage classes described herein, the system is able to select appropriate storage resources for various levels of data. Referring to FIG. 3A, a flow diagram illustrating a routine 300 for storing data is shown. In step 310, the database storage unit receives database data to be stored within the file system of the storage management system. The received request may include a table identifier that is associated with the target table, index, or table subcomponent. In step 320, the file system uses the table identifier to determine the cylinder and exact location where the database data is to be inserted. In step 330, if sufficient empty space exists in that location, then the database data is inserted, as shown in step 340. If there is insufficient space, then the file system requests a free cylinder from the cylinder pool, as shown in step 350. Once the cylinder is acquired, the database data is then stored on the new cylinder, as shown in step 360.

Figure 3B:
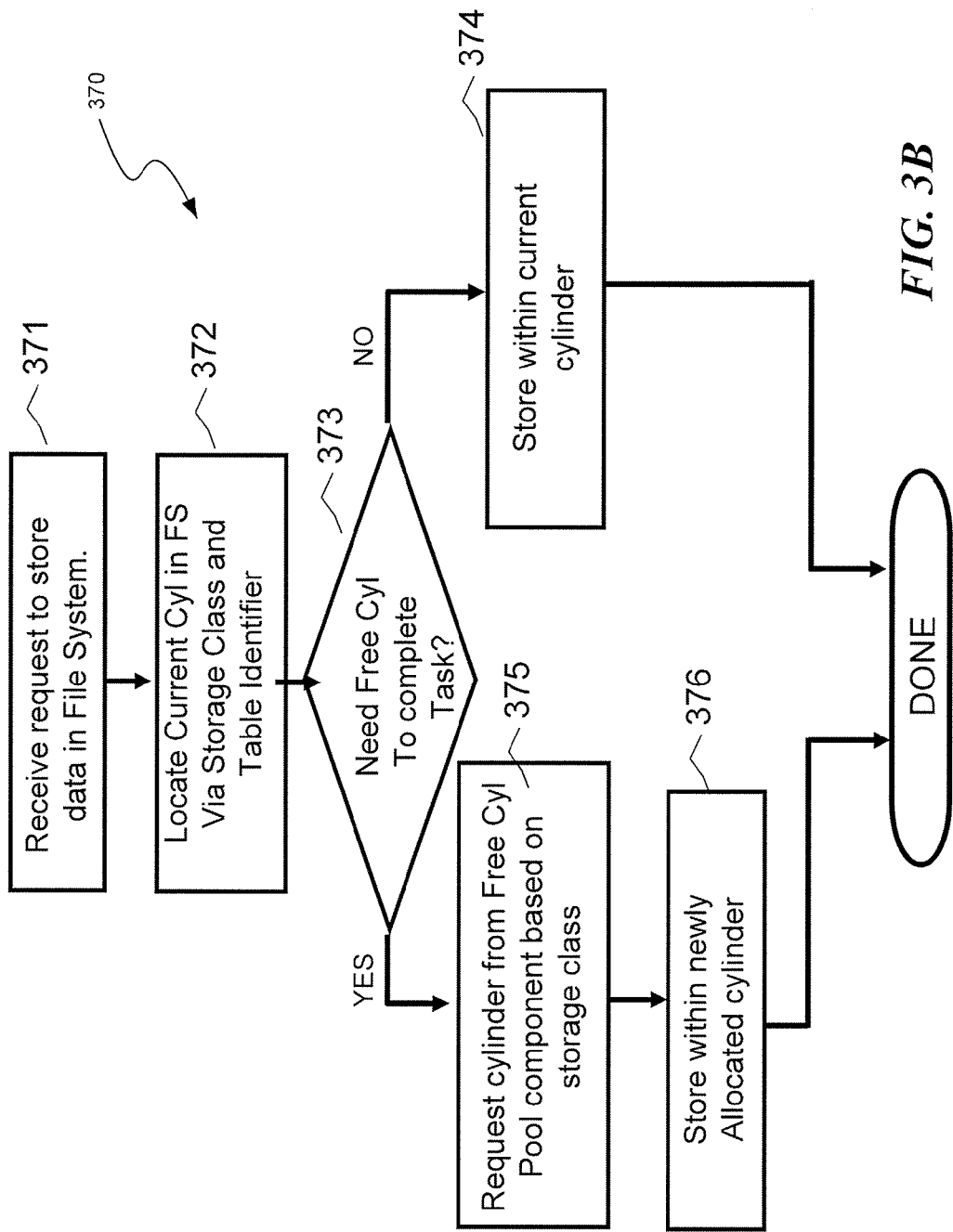

Referring to FIG. 3B, a flow diagram illustrating a routine 370 for storing data based on characteristics of the data is shown. In step 371, the database storage unit receives data to be stored within the file system residing within the storage management system. The received request includes the table identifier and storage class that is associated with the target table, index, or table subcomponent. In step 372, the file system uses the table identifier and the storage class context to determine the cylinder and location onto which the database data is to be written. In step 373, if sufficient space exists on the cylinder, then the database data is written, as shown in step 374. If, however, there is insufficient space on the cylinder, then the file system requests a new cylinder from the free cylinder pool component, as shown in step 375. As part of this cylinder allocation request, the file system passes on the storage class context to the free cylinder pool component.

In step 375, the system identifies storage resources (such as storage media) associated with a storage class of the received data. The system identifies storage resources that have a storage signature satisfying the storage class signature of the storage class. Further details regarding the matching of storage class signatures with storage signatures are discussed herein. Once the free cylinder pool component has allocated the new cylinder, the database data is then stored on the new cylinder, as shown in step 376. In step 376, the system transfers the received data to the identified storage resources to be stored on storage media, such as secondary storage media.

For example, the database storage unit receives database data that is targeted for a table, index, or other table subcomponent associated with the storage class signature 220 shown in FIG. 2. The system compares the storage class signature 220 with storage signatures associated with each of the free cylinder pools within the free cylinder pool component. In this example, the system compares the storage class signature 220 with a disk array based resource and a USB based resource, and selects the disk array resource because it satisfies the required characteristics of the storage class signature 220, including the SDFP (Single Device Failure Protected, a.k.a RAID) characteristic, while the USB based resource does not satisfy that characteristic. The system then transfers the database data to the disk array based resource for storage and, updates the file system to track the storage of the database data to the disk array based resource.

The system, via a database administrator, may create storage signatures and then assign those storage signatures to storage resources using either SQL, or alternatively by using enhanced existing storage management utilities within the data storage system 100. FIG. 9F illustrates an example of a non-ANSI SQL syntax used to create a storage signature. The CREATE STORAGE SIGNATURE SQL statement is used to create a new storage signature possessing an associated set of storage characteristics. Issuing a CREATE STORAGE SIGNATURE statement creates a free cylinder pool within the free cylinder pool component. The free cylinder pool is initially empty, and will be used to manage free cylinders possessing the storage characteristics defined within the CREATE STORAGE SIGNATURE statement. Additionally, as non-limiting examples, the association of storage resources with a storage signature and thus the registration of storage resources to a particular free cylinder pool may be done using the following syntax:

ADD STORAGE <storage signature name> <storage size> TO SYSTEM <semi-colon> and/or ADD STORAGE <storage signature name> <storage size> TO CLIQUE <semi-colon>

The following are SQL-based examples of defined storage signatures for storage resources having varying levels of service with the database system:

CREATE STORAGE SIGNATURE NormA {ATWR=N, SDFP=Y, DDFP=N, SPFP=Y, NVOL=Y, RWRT=Y, CHKS=N, ENCR=N, CMPR=N};

CREATE STORAGE SIGNATURE NormB {ATWR=Y, SDFP=Y, DDFP=N, SPFP=Y, NVOL=Y, RWRT=Y, CHKS=N, ENCR=N, CMPR=N};

CREATE STORAGE SIGNATURE VeryProtectedA {ATWR=N, SDFP=Y, DDFP=Y, SPFP=Y, NVOL=Y, RWRT=Y, CHKS=N, ENCR=N, CMPR=N};

CREATE STORAGE SIGNATURE VeryProtectedB {ATWR=Y, SDFP=Y, DDFP=Y, SPFP=Y, NVOL=Y, RWRT=Y, CHKS=N, ENCR=N, CMPR=N};

ADD STORAGE NormA 20 GB TO SYSTEM;

ADD STORAGE NormB 40 GB TO SYSTEM;

ADD STORAGE VeryProtectedA 100 GB TO SYSTEM;

ADD STORAGE VeryProtectedB 40 GB TO SYSTEM.

Figure 4:
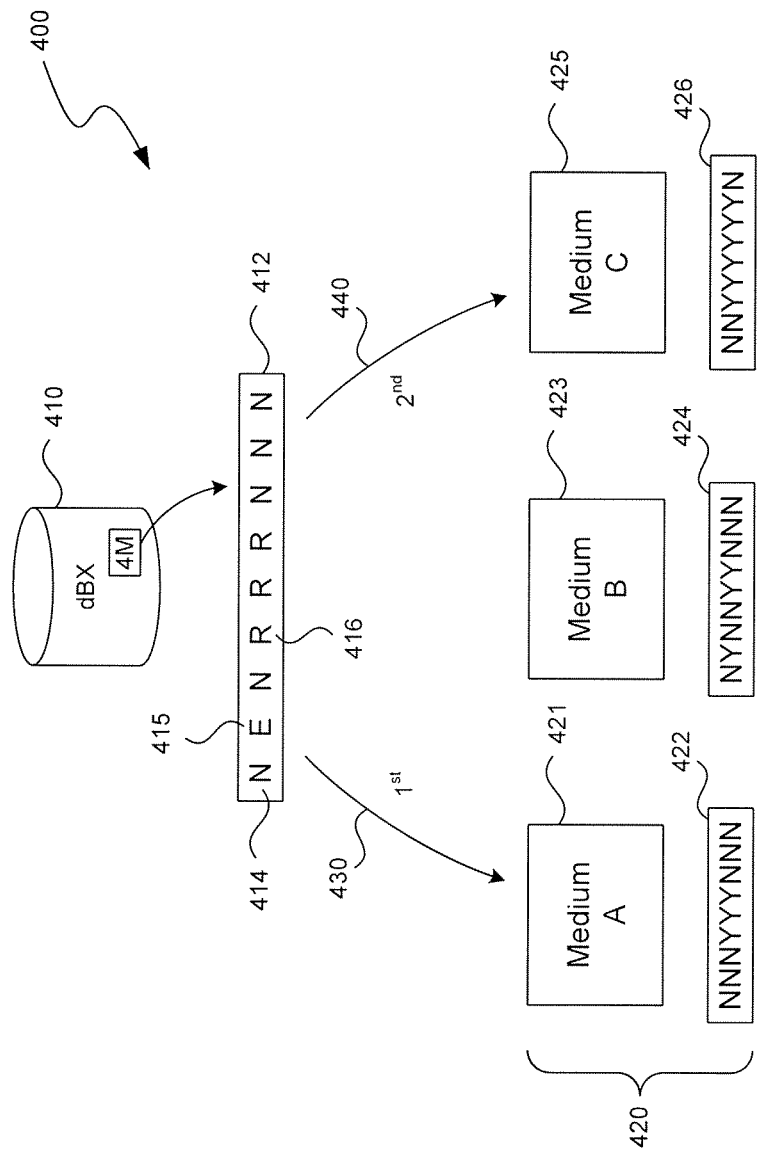
FIG. 4 is a schematic diagram illustrating the storage of data based on characteristics of the data according to an exemplary embodiment.

Referring to FIG. 4, a schematic diagram 400 illustrating the storage of data based on characteristics of the data is shown. A database 410, such as dB X, contains data, such as data to be stored 411. The data to be stored is within a table, index or table subcomponent that is associated with a storage class having a storage class signature 412. The storage class signature 412 includes required characteristics (R) 416, non-required characteristics (e.g., indifferent or ignored) (N) 414, and characteristics to exclude (E) 415. For example, storage class signature 412 is "NENRRRNNN" which represents a storage class of: (ATWR=N, SDFP=E, DDFP=N, SPFP=R, RWRT=R, NVOL=R, CHKS=N, CMPR=N, ENCR=N).

The system employs multiple data storage resources 420 to perform data storage. However, the system will select data storage resources that satisfy the required storage class characteristics for the data represented by the storage class signature 420. As shown in the diagram, the system includes storage medium A (421), managed by a free cylinder pool having a storage signature of "NNNYYYNNN" 422, storage medium B (423), managed by a free cylinder pool having a storage signature of "NYNNYYNNN" 424, and storage medium C (425), managed by a free cylinder pool having a storage signature of "NNYYYYYYN" 426. The system can transfer the data to cylinders drawn from either medium A (arrow 430) or medium C (arrow 450), but cannot transfer the data to cylinders drawn from medium B, as the storage signature 424 does not satisfy the requirements of the storage class of the data.

In some examples, the system may transfer data to storage resources that meet the minimum requirements of the storage class of the data. For example, in FIG. 4, the free cylinder pool component may choose to allocate cylinders from medium A before medium C because medium A is a better match when satisfying the requirements of the storage class. Medium A has values of SPFP=Y, RWRT=Y, and NVOL=Y but does not provide other storage characteristics, unlike medium C which has additional values of DDFP=Y, CHKS=Y, and CMPR=Y. Thus, medium C may be more expensive or unnecessary for the storage of the database data, even though it satisfies the storage class signature.

Figure 5:
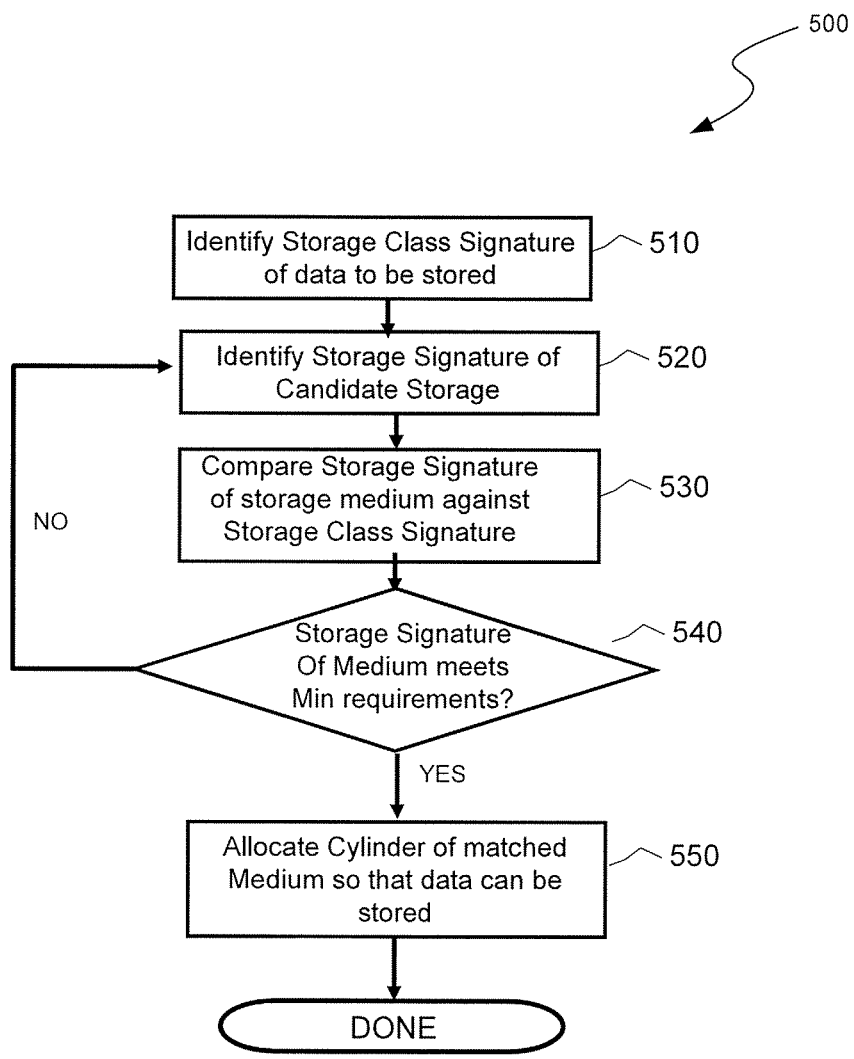
FIG. 5 is a flow diagram illustrating a routine for selecting storage resources for a storage class according to an exemplary embodiment.

Referring to FIG. 5, a flow diagram illustrating a routine 500 that the free cylinder pool component may employ for selecting storage resources for a storage class is shown. In step 510, the system identifies the storage class signature of data to be stored. For example, the system can identify the characteristics for storage media required by the storage class of the data to be stored. In step 520, the system identifies a storage resource (such as a storage medium) that becomes a candidate for satisfying or meeting the storage requirements specified by the storage class signature. In step 530, the system compares the storage signature of the storage medium with the storage class signature of the data to be stored. In step 540, action is taken as a result of the comparison. For example, If the storage signature includes positive values for characteristics not required by the storage class signature of the data, routine 500 proceeds back to step 520 and the system looks for other storage resources that include fewer storage characteristics above the minimum required characteristics. If, however, the signature does not represent additional characteristics attributed to the storage medium (or if there are no other storage media containing fewer unnecessary characteristics), routine 500 proceeds to step 550 and the system associates the storage medium with the data to be transferred.

In other examples, the system may perform a number of different variations of routine 500 when choosing storage resources. For example, the system may skip steps 530 and 540, and associate the first identified storage resource with a storage class. Also, the system may attempt to identify a storage resource that provides only the necessary storage characteristics for only a predetermined amount of time. However, in order to minimize using expensive resources when they are not needed, the system, in some examples, will attempt to identify the lowest performing resources capable of meeting the storage class requirements when possible.

In some cases, multiple storage signatures will match a storage class signature. For example, the Storage Class "NormStorage", having a storage class signature of (ATWR=N, SDFP=R, DDFP=N, SPFP=R, RWRT=R, NVOL=R, CHKS=N, CMPR=E, ENCR=E), is compatible with the following storage signatures:
NormA {ATWR=N, SDFP=Y, DDFP=N, SPFP=Y, NVOL=Y, RWRT=Y, CHKS=N, ENCR=N, CMPR=N};
NormB {ATWR=Y, SDFP=Y, DDFP=N, SPFP=Y, NVOL=Y, RWRT=Y, CHKS=N, ENCR=N, CMPR=N};
VeryProtectedA {ATWR=N, SDFP=Y, DDFP=Y, SPFP=Y, NVOL=Y, RWRT=Y, CHKS=N, ENCR=N, CMPR=N};
VeryProtectedB {ATWR=Y, SDFP=Y, DDFP=Y, SPFP=Y, NVOL=Y, RWRT=Y, CHKS=N, ENCR=N, CMPR=N}.

In some cases, only a few or one storage signature will match a storage class signature (e.g., when the storage class requires many storage characteristics). For example, the Storage Class "VeryProtectedandExpensive", having a storage class signature of (ATWR=R, SDFP=R, DDFP=R, SPFP=R, RWRT=R, NVOL=R, CHKS=N, CMPR=N, ENCR=N), would only be compatible with the storage signature "VeryProtectedB" shown above.

Thus, in some examples the system enables database administrators and other associated users to create quality of service levels, called storage classes, for database systems and enables systems engineers to identify storage characteristics associated with storage attached to the system via their storage signatures. Furthermore, the system provides the association of quality of storage classes with database components, including data, databases, users, permanent tables, temporary tables, intermediate tables, LOB/LOB-UDT columns, permanent journals, fallback storage, and so on, and provides for a database GRANT/REVOKE permissions model built around storage classes.

User-Defined Storage Characteristics

In some examples, the system enables users, such as database administrators, to define characteristics or attributes for database components and the storage classes assigned to the database components. Assigning user-defined characteristics to database components allows administrators to support new storage abstractions such as cost factors, location factors, trust factors, use factors (such as backup and recall factors), user and group factors, and so on. Additionally, user-defined characteristics can be business specific, giving businesses the opportunity and ability to create storage class characteristics that meet (and continue to meet) the needs of their business.

Figure 6:
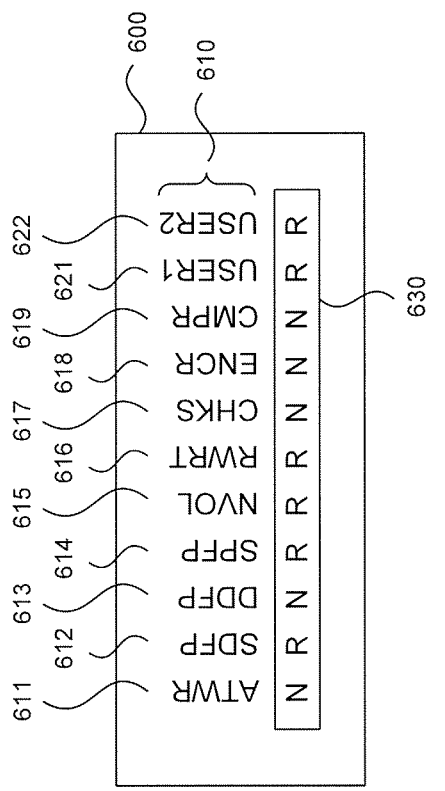
FIG. 6 is a schematic diagram illustrating a storage class for a database component including user-defined storage characteristics according to an exemplary embodiment.

Referring to FIG. 6, a schematic diagram 600 illustrating a storage class for a database component including user-defined storage characteristics is shown. The storage class includes a plurality of storage class characteristics, including system defined characteristics 611-619 and user-defined characteristics 621 and 622. The storage class also includes values assigned to the characteristics in a storage class signature 630. For example, the user-defined characteristics 621 and 622 have a required (R) in the storage class signature. Thus, the system will store database components associated with this storage class in or using storage resources that have a storage signature that supports the User1 and User2 user-defined characteristics.

A database administrator may establish or create a user-defined storage class by defining the characteristics of the storage class and the value of one or more characteristics of the storage class. FIG. 10A illustrates an example non-ANSI SQL syntax for statements used when creating a user-defined storage class.

The CREATE STORAGE ATTRIBUTE statement can be used to define the allowable scope of values to be assigned to the user-defined storage characteristic. Additionally, vendor supported policing can be enforced during the issuance of subsequent CREATE STORAGE CLASS statements. The CREATE STORAGE ATTRIBUTE statement also provides the user with the ability to declare a default value that can be associated with a user-defined storage characteristic. Thus, existing and subsequent storage class specifications can have a particular user-defined storage characteristic set to the user specified value.

Figure 7:
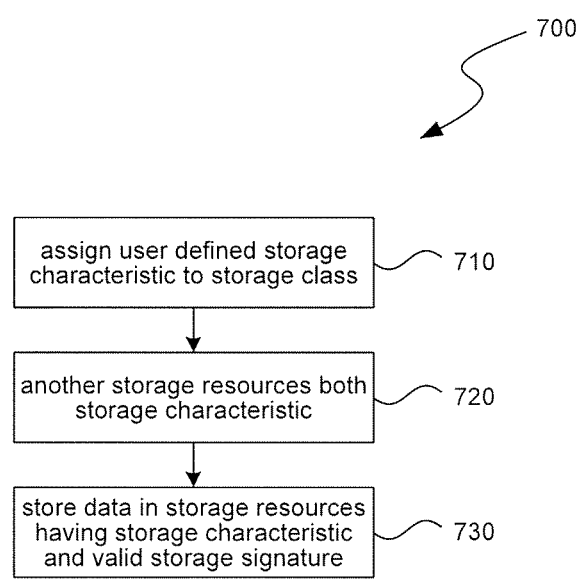
FIG. 7 is a flow diagram illustrating a routine for storing data based on user-defined characteristics for data according to an exemplary embodiment.

Using one or more user-defined storage characteristics, the system (or an administrator of the system) can then store data into storage resources that satisfy the requirements of the storage class for the data or for database components associated with the data. FIG. 7 illustrates a flow diagram of routine 700 for storing data based on user-defined characteristics for data. In step 710, the system assigns user-defined storage characteristics to a storage class associated with data to be stored into storage resources. For example, an administrator creates one or more user-defined characteristics, and defines the storage class to include these characteristics. FIG. 10B illustrates an example syntax for an SQL-based example of instructions used when creating a storage class signature having user-defined characteristics.

The following examples illustrate how user-defined storage characteristics may be used by a database administrator in order to model named storage quality of service levels.

For example, if a department purchases very expensive high performance series of disk arrays, and only wants members of the department to have access to them, the DBA could issue the following statements to the database:
CREATE STORAGE ATTRIBUTE AdminStorage
WITH STORAGE PARAMETER ADMN (R, E, N)
DEFAULT E;
The DBA then issues:
CREATE STORAGE SIGNATURE AdminStorage {ATWR=N, SDFP=Y, DDFP=N, SPFP=Y, NVOL=Y, RWRT=Y, CHKS=N, ENCR=N, CMPR=N, ADMN=Y};
The DBA can then add storage by issuing the following statement:
ADD STORAGE AdminStorage 20 GB TO SYSTEM;
The DBA then creates the new storage class (or, quality of service level) with the following statement:
CREATE STORAGE CLASS AdminStorage WITH STORAGE PARAMETER (ATWR=N, SDFP=R,

DDFP=N, SPFP=R, NVOL=R, RWRT=R, CHKS=N, ENCR=E, CMPR=E, ADMN=R);

The DBA then grants users in the administration department permission to use the new storage class:

GRANT STORAGEUSAGE ON AdminStorage TO Admin Users;

Administration users can then place store database components on the new disk arrays. For example:

CREATE TABLE AdminInfo, IN STORAGE CLASS AdminStorage (Id integer, name varchar(40), account_total decimal(9,2), account_type integer).

For example, if a company constructs a fire-safe facility away from the main complex and purchases highly reliable and secure disk array products featuring compression, encryption, and checksum protection, the company may want to make this storage accessible only to a selected group of users. In this example, the DBA can issue the following SQL statement to the database:

CREATE STORAGE ATTRIBUTE FireSafeStorage WITH STORAGE PARAMETER FSS (R, E, N) DEFAULT E;

The DBA can then issue the following statement:

CREATE STORAGE SIGNATURE FireSafeStorage {ATWR=N, SDFP=Y, DDFP=Y, SPFP=Y, NVOL=Y, RWRT=Y, CHKS=Y, ENCR=Y, CMPR=Y, FSS=Y};

The DBA can then add storage by issuing the following statement:

ADD STORAGE FireSafeStorage 2000 GB TO SYSTEM;

The DBA then creates the new storage class (or, quality of service level):

CREATE STORAGE CLASS FireSafeAndSecureStorage WITH STORAGE PARAMETER (ATWR=N, SDFP=R, DDFP=R, SPFP=R, NVOL=R, RWRT=R, CHKS=R, ENCR=R, CMPR=R, FSS=R);

The DBA next grants select users in the company permission to use the new storage class:

GRANT STORAGEUSAGE ON FireSafeAndSecureStorage TO SelectedUsers;

The targeted users can store database components they require on the new disk arrays. For example:

CREATE TABLE EmployeeRecords, IN STORAGE CLASS
FireSafeAndSecureStorage (EmployeeId integer, EmployeeName varchar(40), salary decimal(9,2), hired_on date).

In step 720, the system enables storage resources that satisfy the user-defined characteristics (and, values of the user-defined characteristics). That is, the system creates storage signatures for storage resources that include the user-defined characteristic. For example, an administrator can define the storage signature for one or more storage resources as follows: CREATE STORAGE SIGNATURE AdminStorage {ATWR=N, SDFP=Y, DDFP=N, SPFP=Y, NVOL=Y, RWRT=Y, CHKS=N, ENCR=N, CMPR=N, ADMN=Y}, with "ADMN" being a user-defined characteristic assigned a value of "Y". Thus, data components having a storage class signature that includes an "ADMN=R" can be stored in storage resources having the AdminStorage signature (at least with respect to the ADMN characteristic). The system may create the storage signature in any number of ways. FIG. 100 illustrates an example syntax for a non-ANSI SQL based example of instructions used to create a storage signature.

In step 730, the system stores data into one or more storage resources that have a matching storage signature with the storage class signature associated with the data.

Figure 8:
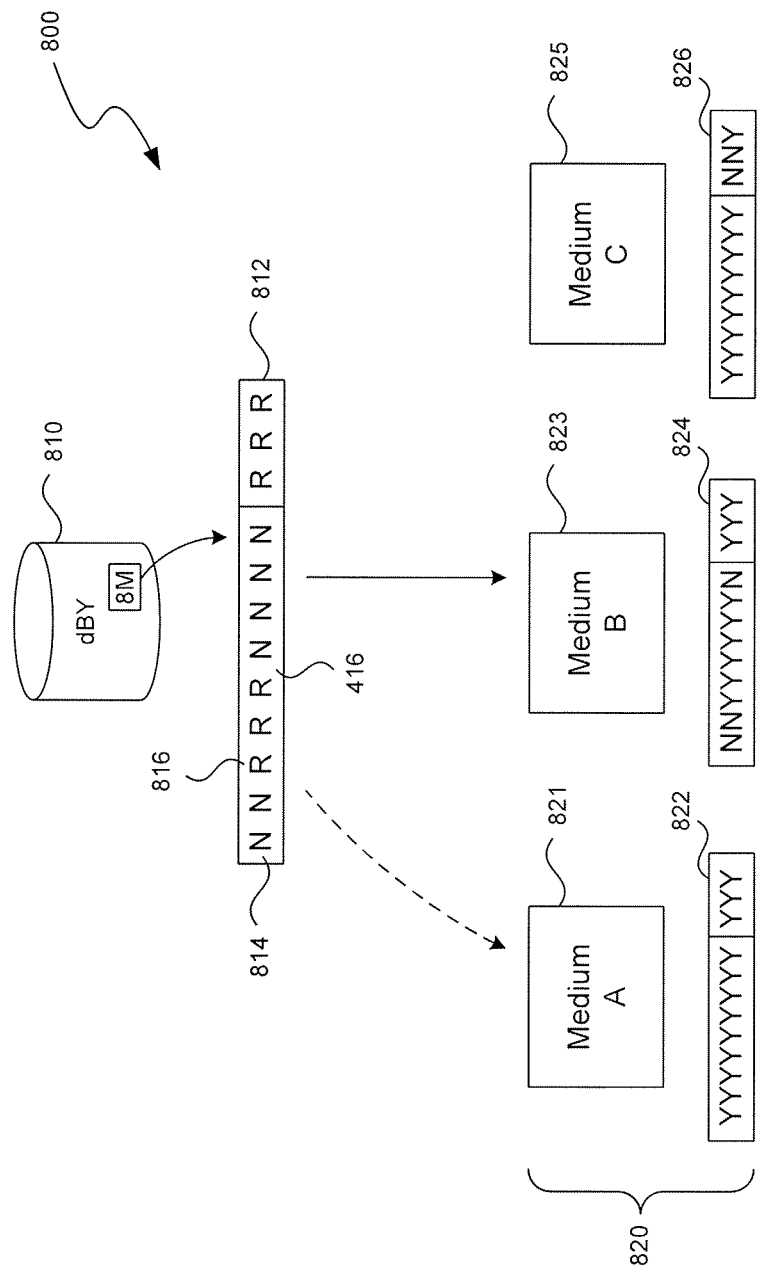
FIG. 8 is a schematic diagram illustrating the storage of data based on user-defined characteristics for data according to an exemplary embodiment.

As discussed with respect to FIG. 4, the system may also store data into and using a plurality of storage resources that satisfy the requirements of the user-defined storage classes associated with data to be stored. Referring to FIG. 8, schematic diagram 800 illustrates the storage of data based on user-defined characteristics of the data. A database 810, such as dB Y, contains data, such as data to be stored 811. The data to be stored is within a storage class having a storage class signature 812. The storage class signature 812 includes required characteristics (R) 816, non-required characteristics (N) 814, and user-defined characteristics 818. For example, storage class signature 812 is "NNRRRNNNNRRR" which represents a storage class of: (ATWR=N, SDFP=N, DDFP=R. SPFP=R, RWRT=R, NVOL=N, CHKS=N, CMPR=N, ENCR=N, USER1=R, USER2=R, USER3=R).

The system can employ multiple data storage resources 820 to perform data storage. However, the system will select data storage resources that satisfy the required user-defined and system-defined storage class characteristics for the data represented by the storage class signature 820. As shown in the diagram, the system includes storage medium A (821) having a storage signature of "YYYYNYYYYYYY" 822, storage medium B (823) having a storage signature of "NNYYYYYYNYYY" 824, and storage medium C (825) having a storage signature of "YYYYYYYYYNNY" 826. The system can allocate storage for the purpose of storing the data in database DB Y, from either medium B (bold arrow) or possibly medium A (dotted arrow), but cannot allocate storage for the data from medium C, as the storage signature 826 does not satisfy the user-defined requirements of the storage class of the data.

In some examples, other storage allocation policies are possible. For example, the system may transfer data to storage resources that satisfy some or all of the user-defined characteristics but not all of the system-defined characteristics. For example, in FIG. 8, the system may choose medium B because medium B satisfies all the system-defined requirements and all of the user-defined requirements. However, in some cases the system may choose medium A, even if medium A does not satisfy all of the system-defined characteristics. For example, there may be times when the only available storage resources are those having the signature of medium A. The system may place more importance on the user-defined characteristics (overriding logic that may require all system-defined characteristics to be matched) and allow storage resources having acceptable user-define storage characteristics to receive data even though the storage resources do not satisfy all of the system-defined requirements. The system may include such logic in storage policies or other data structures that define when and where to store data. Thus, in addition to creating user-defined characteristics for storage classes, database administrators of the system may be able to assign some characteristics (such as user-defined characteristics) higher importance over other characteristics (such as system-defined characteristics), further modifying storage policies to meet their ever changing storage needs.

Compatibility

In some examples, the system described herein can be used with existing storage management utilities, such as existing database systems, that are not able to selectively store data based on usage of the data. In those cases, a database administrator can assign characteristics to the storage resources of the system. For example, when attaching a storage resource to a database system, the administrator assigns a value of "yes" or "no" to some or all storage characteristics used in establishing the storage classes of data, providing the storage resource with a storage signature.

In some examples, the system contains compatible storage resources attached to a database system. These resources may have different storage signatures but are able to store data from a given storage class having a given storage class signature. The system can then store data of the given storage class within storage resources that satisfy the requirements of the storage class.

In some examples, the system enables users such as database administrators to define storage characteristics, attributes or parameters for storage resources and/or data. User defined characteristics may expand a storage class signature or a storage signature. The system can then enable administrators to decide how and where to store given types of data having various usages.

Thus, in some examples the system is able to accommodate large amounts of complex data types (such as BLOBs, CLOBs, UDTs, image data types, audio data types, video data types) within a database system. Also, the system allows the database system to store rarely used data with some resources and core business data at other, more reliable and accessible resources.

CONCLUSION

The system described herein may be implemented on various computing systems or devices including personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The system described herein may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. While the description provided herein is made with reference to SQL and non-ANSI SQL statements and databases, the systems and methods described herein could be used with any other form of database for storing data on devices.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

All of the above patents and applications and other references, including any that may be listed in accompanying filing papers, are incorporated by reference. Aspects of the system can be modified, if necessary, to employ the systems, functions, and concepts of the various references described above to provide yet further embodiments of the system.

These and other changes can be made to the system in light of the above Detailed Description. While the above description details certain embodiments of the system and describes the best mode contemplated, no matter how detailed the above appears in text, the system can be practiced in many ways. Details of the local-based support system may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. For example, while only one aspect of the system is recited as embodied in a computer memory, other aspects may likewise be embodied in a computer memory. Accordingly, the inventors reserve the right to add additional claims after filing the application to pursue such additional claim forms for other aspects of the system.

The invention claimed is:

1. A method of selecting a hardware data storage device in which to store database data, the method comprising:
providing a number of lower performance hardware data storage devices and a number of higher performance hardware data storage devices in which each hardware data storage device has a storage signature associated therewith, wherein the storage signature of each hardware data storage device comprises (i) a number of affirmative values which represent supported data storage characteristics of the hardware data storage device, and (ii) a number of negative values which represent unsupported data storage characteristics of the hardware data storage device;
receiving a request to store database data which has a storage class signature associated therewith, wherein the storage class signature associated with the database data to be stored comprises (i) a first value which represents that a first data storage characteristic is required to be supported by a selectable hardware data storage device on which the database data can be stored, (ii) a second value which is different from the first value and which second value represents that a second data storage characteristic is required to be excluded and unsupported by a selectable hardware data storage device on which the database data can be stored, and (iii) a third value which is different from the first and second values and which third value represents that a third data storage characteristic is neither required to be supported nor required to be excluded and unsupported by a selectable hardware data storage device on which the database data can be stored;
reviewing storage signatures of one or more hardware data storage devices; and
selecting at least one hardware data storage device having a storage signature that matches the storage class signature associated with the database data to be stored in the hardware data storage device.

2. The method of claim 1, wherein selecting includes selecting a hardware data storage device having a storage signature that most closely matches the storage class signature associated with the database data to be stored when at least some portions of storage signatures of two or more hardware data storage devices match the storage class signature associated with the database data to be stored.

3. The method of claim 1, wherein the database data to be stored is contained within a database assigned a matching storage class signature.

4. The method of claim 1, wherein the database data to be stored is contained within a table assigned a matching storage class signature.

5. The method of claim 1 wherein at least one of the first, second, and third data storage characteristics includes an atomic write characteristic.

6. The method of claim 1, wherein at least one of the first, second, and third data storage characteristics includes a single device failure protected characteristic.

7. The method of claim 1, wherein at least one of the first, second, and third data storage characteristics includes a double device failure protected characteristic.

8. The method of claim 1, wherein at least one of the first, second, and third data storage characteristics includes a single path failure protected characteristic.

9. The method of claim 1, wherein at least one of the first, second, and third data storage characteristics includes a re-writable media characteristic.

10. The method of claim 1, wherein at least one of the first, second, and third data storage characteristics includes a non-volatile media characteristic.

11. The method of claim 1, wherein at least one of the first, second, and third data storage characteristics includes a checksum protected data and path characteristic.

12. The computer memory of claim 1 wherein at least one of the first, second, and third data storage characteristics includes a data compression characteristic.

13. The computer memory of claim 1 wherein at least one of the first, second, and third data storage characteristics includes a data encryption characteristic.

14. A method of selecting a hardware data storage device in which to store database data, the method comprising:
providing a number of lower performance hardware data storage devices and a number of higher performance hardware data storage devices in which each hardware data storage device has a storage signature associated therewith, wherein the storage signature of each hardware data storage device comprises (i) a number of affirmative values which represent supported data storage characteristics of the hardware data storage device, and (ii) a number of negative values which represent unsupported data storage characteristics of the hardware data storage device;
receiving a request to store database data which has a storage class signature associated therewith, wherein the storage class signature associated with the database data to be stored comprises (i) a first value which represents that a first data storage characteristic is required to be supported by a selectable hardware data storage device on which the database data can be stored, (ii) a second value which is different from the first value and which second value represents that a second data storage characteristic is required to be excluded and unsupported by a selectable hardware data storage device on which the database data can be stored, and (iii) a third value which is different from the first and second values and which third value represents that a third data storage characteristic is neither required to be supported nor required to be excluded and unsupported by a selectable hardware data storage device on which the database data can be stored;
comparing the first, second, and third values of the storage class signature with a storage signature of a hardware data storage device to (i) determine if the hardware data storage device supports the first data storage characteristic, and (ii) determine if the hardware data storage device does not support the second data storage characteristic; and
selecting the hardware data storage device to store the database data when a determination is made that the hardware data storage device supports the first data storage characteristic and the hardware data storage device does not support the second data storage characteristic, and not selecting the hardware data storage device when a determination is made that the hardware data storage device does support the second data storage characteristic.

15. The method of claim 14, wherein each of the first, second, and third data storage characteristics includes one of an atomic write characteristic, a single device failure protected characteristic, a double device failure protected characteristic, a single path failure protected characteristic, a re-writable media characteristic, a non-volatile media characteristic, a checksum protected data and path characteristic, a data compression characteristic, and a data encryption characteristic.

16. The method of claim 14, wherein at least one of the first, second, and third data storage characteristics includes a characteristic related to a data transfer speed supported by the hardware data storage device.

17. The method of claim 14, wherein at least one of the first, second, and third data storage characteristics includes a characteristic related to security of the hardware data storage device.

18. The method of claim 14, wherein at least one of the first, second, and third data storage characteristics includes a characteristic related to data loss prevention of the hardware data storage device.

19. The method of claim 14, wherein each of the first, second, and third data storage characteristics includes one of an atomic write characteristic, a single device failure protected characteristic, a double device failure protected characteristic, a single path failure protected characteristic, a re-writable media characteristic, a non-volatile media characteristic, a checksum protected data and path characteristic, a data compression characteristic, and a data encryption characteristic.

* * * * *